United States Patent [19]

Richardson

[11] Patent Number: 4,737,614

[45] Date of Patent: Apr. 12, 1988

[54] OPTICAL IMAGE CONTROL FOR AUTOMATED ARC WELDING SYSTEM VISION SYSTEM

[75] Inventor: Richard W. Richardson, Columbus, Ohio

[73] Assignee: The Ohio State University Research Foundation, Columbus, Ohio

[21] Appl. No.: 923,431

[22] Filed: Oct. 27, 1986

Related U.S. Application Data

[63] Continuation-in-part of Ser. No. 854,510, Apr. 22, 1986, Pat. No. 4,644,131.

[51] Int. Cl.[4] .................................................. B23K 9/10
[52] U.S. Cl. ............................ 219/130.01; 219/124.34; 358/101
[58] Field of Search ....................... 219/124.34, 130.01; 358/101

[56] References Cited

U.S. PATENT DOCUMENTS 4,532,406 7/1985 Povlick et al. .................. 219/124.34

Primary Examiner—Clifford C. Shaw
Attorney, Agent, or Firm—Sidney W. Millard

[57] ABSTRACT

An improved optical portion of a vision system for controlling an automated arc welding system. Collimated, image bearing light is rotated through an angle to maintain the weld scene at the identical orientation upon the video camera regardless of actual orientation changes during welding operation. An iris reduces the light intensity to maintain the light which is incident upon the video camera from the more intense weld pool region, within the range of the camera while light from the joint region is integrated over multiple frames so that good resolution is also obtained for the image of the joint region.

11 Claims, 2 Drawing Sheets

OPTICAL IMAGE CONTROL FOR AUTOMATED ARC WELDING SYSTEM VISION SYSTEM

This invention was made with government support under contract number NAS8-35595 awarded by the National Aeronautics and Space Administration. The government has certain rights in this invention.

This application is a continuation-in-part of my copending application Ser. No. 854,510, filed on Apr. 22, 1986 now U.S. Pat. No. 4,644,131.

TECHNICAL FIELD

This invention relates generally to arc welding and more particularly relates to control of the optical image of a computer controlled gas arc welding system of the type having a vision system providing video data input to a control computer which controls the positioning, wire feed rate, weld current and translation rate of the welding torch along a weld joint.

BACKGROUND ART

Arc welding systems with robot mounted welding torches have been developed to improve weld uniformity and reproduceability and to increase productivity in arc welding fabrication. Some systems have been developed using no joint or weld detection system, but instead are preprogrammed to provide a fixed sequence of motions and process actions. Such a system then merely repeats the sequence of motions and process actions for each weld. In order for such a system to operate effectively, both the welding equipment and the workpiece must be precisely positioned with reliable repetition. Any deviation in the welding equipment, the positioning of the workpiece or the path of the joint results in an inadequate weld.

Other systems have been developed to detect the joint or seam or otherwise detect or sense the weld conditions and adjust the weld parameters and torch positioning accordingly. Among these are vision systems utilizing optical detection for detecting weld and joint position and dimensional parameters.

The above identified copending application discloses a torch with a coaxial vision system which is used to obtain the weld image. In that torch an imaging lens is placed inside the gas cup so that the optical axis is coincident with the axis of the weld torch and the weld electrode. In that system an associated optical system converts the optical image of the weld pool and the weld joint to electronic video signals so that the image can be analyzed in real time and the results of the analysis used to control the welding operation. For example, the middle and edges of the weld pool and the joint are detected and used by the electronic control system to develop signals which control the weld parameters. Cross seam control is obtained by detecting the center of the weld pool relative to the weld joint. The width of the joint opening is used to control the cold wire feed and the width of the weld pool is used to control weld current.

Typically, the weld image is converted to electronic signals by means of a television camera of a type which is commercially available. One difficulty with such a system is that, although the weld torch must be capable of moving in many directions and may even rotate about its central axis, such motion causes the image in the television camera to be similarly rotated or oriented as it follows the weld joint with the result that the image of the joint may be projected onto the detector of the television camera at various angles. This variation in the orientation of the weld seam and joint greatly complicates the process of analyzing the video data for control of the welding process.

It is therefore an object and purpose of the present invention to provide an optical system which maintains the identical weld joint and seam orientation in the television camera, thereby greatly simplifying computer analysis of the video data.

Another problem with utilizing a television camera is the need to control the intensity of the light which is incident upon the detector of the camera so that this intensity is within the operating range for which the camera was designed. This is complicated by the fact that the light from the weld pool region, which is immediately adjacent the arc, has a considerably higher intensity than the light from the joint and yet a sufficiently high resolution image showing the details of both is needed.

It is therefore an object and feature of the present invention to provide an optical system which will control the intensity of the light from the weld pool region and maintain it within the operating range of the television camera and yet will permit the imaging and detection of image data from the relatively darker joint region.

BRIEF DISCLOSURE OF INVENTION

In the present invention the weld seam and joint are maintained at a single identical orientation, preferably vertical, as the torch moves by optically rotating the image bearing light from the weld scene through an angle which is substantially identical to any deviation of the weld seam and joint from the desired orientation. An image rotator, such as a dove prism, is controlled either manually or preferably by the control computer as a result of its analysis of the electronic video image data and is used to rotate the image bearing light through the necessary angle to maintain the image at the desired angular orientation on the video camera. Light intensity is maintained within the camera's operating range by reducing the light intensity, for example by means of an iris, so that the intensity of the light from the weld pool is within the brightness operating range of the detector and then integrating the light incident upon the detector of the camera from the joint region of the weld over a plurality of camera frames, such as by activating the IIG control input to the camera for one or more frames.

Figure 1:
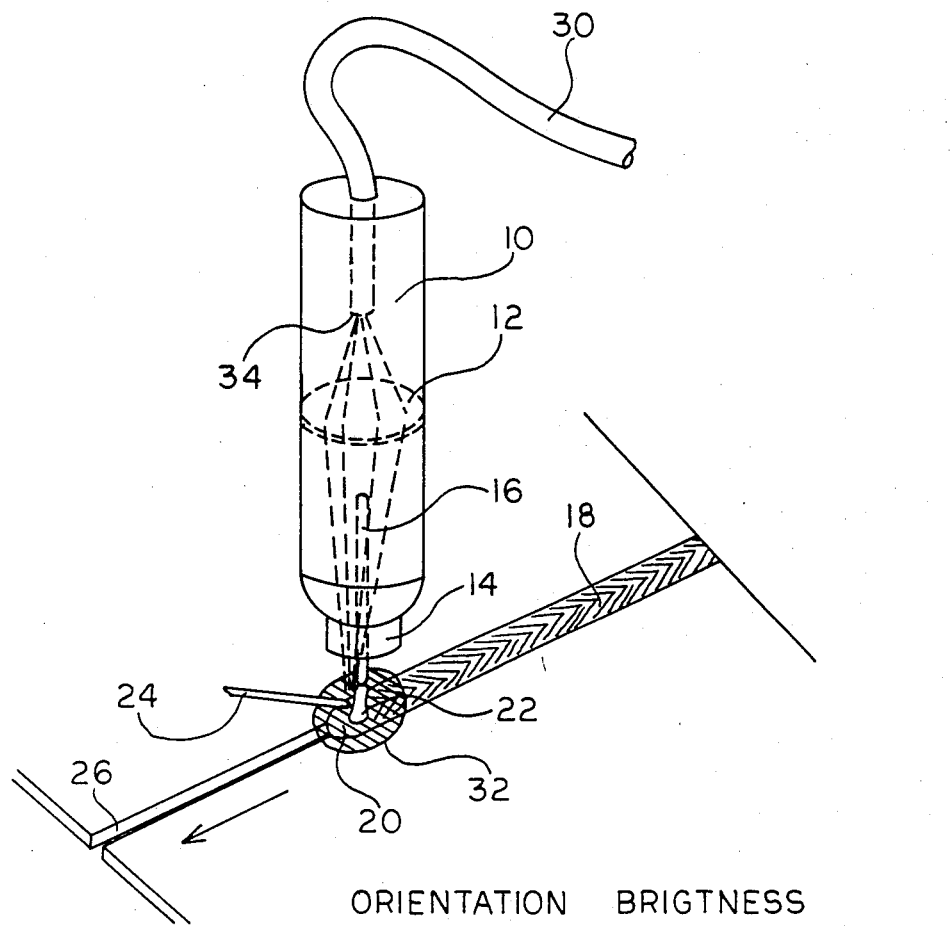
FIG. 1 is a diagrammatic view in perspective illustrating a weld torch, the weld scene and an attached fiber optic bundle which are a portion of the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 illustrates a gas arc welding torch 10 having a primary imaging lens 12 mounted with its image axis coaxial with the gas cup 14 and the electrode 16 within the torch. Below the torch is a completed weld seam 18, a weld pool 20 heated by the arc 22 and fed by the cold wire 24. Ahead of the weld pool is the weld joint 26.

The lens 12 focuses a reduced image of the weld scene 32 onto the end face 34 of the fiber optic bundle 30. The field of view, as represented by the outer periphery of the weld scene 32 is limited by the bottom inside diameter of the gas cup 14.

The fiber optic bundle 30 optically transmits the image of the weld scene to a remote location where the television camera and the optical system of the present invention are located. These components are remote from the congested and hot environment of the welding region and can be suitably protected.

Figure 2:
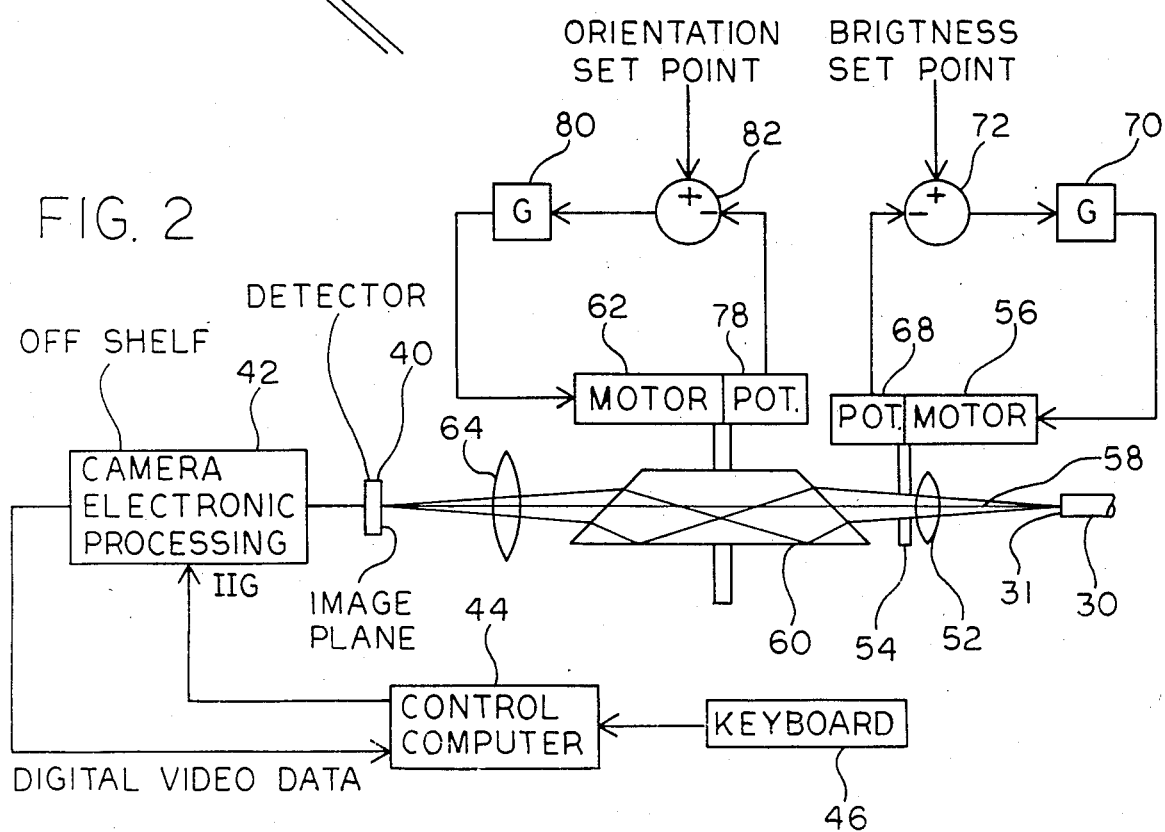
FIG. 2 is a schematic diagram of the preferred embodiment of the invention.
Figure 4:
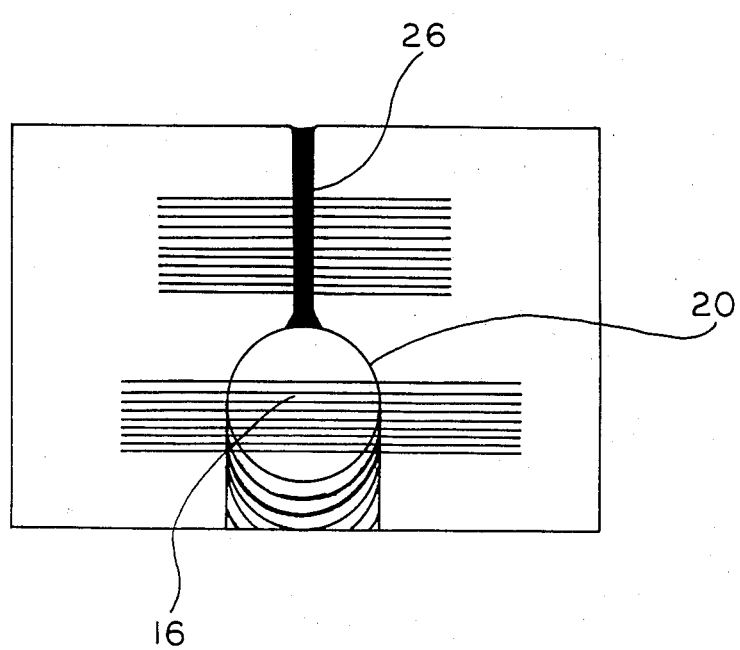
FIG. 4 is an illustration of a top view of a video weld scene.

As illustrated in FIG. 2 light from the opposite end of the fiber optic bundle 30 is directed through optical structures of the present invention onto the image plane of the detector 40 of a commercially available video camera. There the image is converted to electrical signals which are processed by the camera electronic processing circuitry 42, some of which is physically located in the camera and other of which is located in a separate housing. The result, in the preferred commercially available camera, is a standard RS170 analog video signal which can be displayed to form the image of the weld scene of FIG. 4 and a digital video data signal which may be applied to the image analysis and process control computer 44. A keyboard 46 is also connected to the control computer 44 for manual input and control.

The resulting image provides an unimpeded view of the weld area including the weld joint, the weld pool and the weld seam, all illuminated by light from the arc. The brightest core of the arc is shielded by the optical shadow of the electrode 16. This weld scene image is analyzed by conventional image analysis techniques to extract information regarding location of the weld joint and the weld pool edges which in turn provides information on both the location and the diameter of the weld pool. This data is utilized to control the relative positioning of the torch with respect to the weld joint, the size of the weld pool by control of weld current and the cold wire feed rate all in accordance with conventional principles.

Turning now to the present invention in more detail, the fiber optic image bundle 30 consists of individual fibers arranged coherently into a circular matrix at each end. For example, I used a fiber optic image bundle supplied by American ACMI designated as #5660 type image bundle and made up of over 100,000 individual fibers. The active area of the end of the image bundle is 5 millimeters in diameter. The image of the weld scene is focused onto that 5 millimeter diameter area by the lens 12 and transmitted in the fiber bundle from its end 34 to its end 31.

The preferred television camera is a TN2500 Solid State TV Camera sold by General Electric. It has an array of 244×248, thus providing 60,512 digitized pixel intensities for each 1/30th of a second frame. The camera provides two separate output video image signals. One signal is a standard RS170 analog video signal suitable for display directly on a standard closed circuit tv monitor. The frame rate is the standard 30 frames per second, but the option is chosen to use a sequential, rather than interlaced, video format. This simplifies acquisition of the video data by the computer. The other video output from this camera is provided as 8 bit, parallel, digital signals with additional control and timing signals. Each 8 bit digital word represents the intensity of the light falling on a specific pixel of the solid state camera detector array to provide digitized pixel intensities for each video frame. The horizontal and vertical clock or synchronization signals allow each digitized video word to be associated with the specific pixel from which it was derived on the detector array. These digitized video pixels are then analyzed by the image analysis computer and may be analyzed in a conventional manner.

The TN2500 camera has an inject inhibit gate or IIG for controlling light integration of each pixel. Solid state cameras integrate the light to each pixel over a period of time to produce the light intensity level of that video pixel. Normally light is integrated for one frame, the integrated intensity for each pixel of that frame is detected and the process is repeated for subsequent frames. The IIG, however, allows the light incident on the camera to be integrated over additional frames in increments of 1/30th of a second. Since the IIG can be turned on or off at any time, in the present invention it is actuated during subsequent additional 1/30th of a second frames for that portion of the scanning sequence during which the image of the joint 26 is being detected. This allows the video image of the joint region to be integrated for a longer period of time than the 1/30th of a second of the normal frame and in particular for an integral number of such frames. Thus, although less light is incident upon the video camera detector originating from the joint 26 region, it is integrated over a longer period of time, that is over multiple frames, whereas the region of the pool 20 is integrated only over a single frame.

Therefore, although the light reflected from the weld pool 20 region is considerably brighter than light reflected from the joint 26 region, the region of the joint 26 can have an equally bright image signal because it is integrated over multiple frames. That allows the image analysis to be performed with equal resolution for both portions of the weld scene image while operating the detector of the camera within its operating range for the more intense light coming from the weld pool 20 region.

Figure 3:
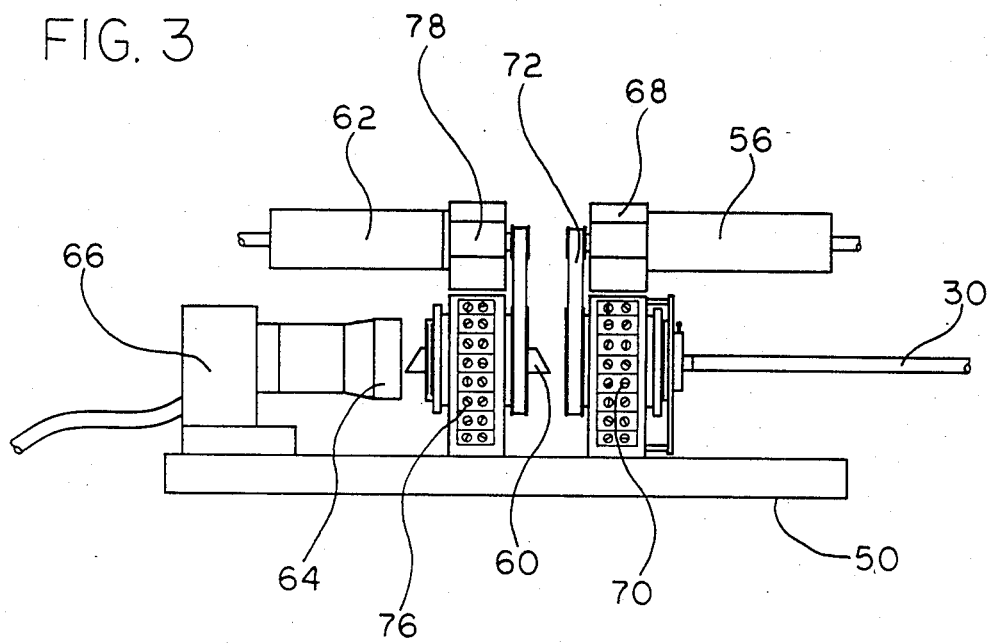
FIG. 3 is a view in side elevation of the principal optical structures of the present invention.

FIGS. 2 and 3 illustrate more detail of the optical system of the present invention. The optical components are mounted to a standard optical bench 50. In general, they include a collimating lens 52 and an iris 54 which are driven in rotation by a servo motor 56 and a suitable support drive and structure which mounts the lens 52 and iris 54 coaxially with the optical axis 58.

Light then passes along the optical axis through an image rotating means 60 preferably in the form of a dove prism, the major axis of which lies along the optical axis 58. The dove prism 60 is driven in rotation by a servo motor 62. From the image rotating means light passes through the camera focusing lens 64 onto the camera detector 40 within the body of the camera 66.

Rotation of the iris 54 varies the aperture through which the light passes and thus varies the light intensity. The collimating lens 52 is symmetrical about the optical axis 58 and may conveniently be mounted on the rotator for the iris 54, although that is not necessary. It collimates the light for incidence upon the dove prism 60.

Structurally, the DC motor 56 and the feedback potentiometer 68 are connected to the rotator unit 70 by means of a timing drive belt 72. The iris actuator lever is held stationary by a small bracket so that rotation of the iris in one direction closes it and in the opposite direction opens it. Its position is controlled by a conventional feedback control system which includes not only the motor 56 and its potentiometer 68, but also a high gain amplifier 70 and a summing junction 72 which provides a means for detecting the difference between the servo position, as indicated by the potentiometer 68, and a brightness set point which may be set manually, but preferably is set by the control computer 44. The set point is set to provide a light intensity for the weld pool region which is within the operating range of the television camera. The size of the opening of the aperture is proportional to the position at the potentiometer which in turn is proportional to the light intensity through the iris. Therefore the feedback signal from the potentiometer represents the size of the aperture and therefore the intensity of the light.

Thus, the feedback control system servo loop controls the absolute position of the iris preferably as commanded by a set point from the vision computer system. The vision control computer controls the servo set point in order to maintain a desired video level or light intensity within the operating range of the camera as detected as a part of the image processing.

The optical image rotating dove prism 60 has a similar rotator 76 which includes not only the DC servo motor 62 but also its feedback position sensing potentiometer 78. The motor 62 and potentiometer 78 are also connected in a conventional feedback control loop to a high gain amplifier 80 and a summing junction 82. The summing junction 82 receives an orientation set point signal which may be manually input or preferably is generated by the control computer to position the dove prism 60 at the appropriate angle of rotation which corresponds to the selected set point to maintain the image orientation.

The light which passes from the iris 54 through the dove prism 60 then passes through the camera lens 64 which is adjusted to infinity so that the parallel rays of collimated light are focused on the image plane of the camera detector 40. In this manner the image is always presented to the tv camera in the same orientation with reference to the direction of the weld path. Thus, for example, an image is always presented in which the weld path is from bottom to top of a displayed video signal.

It is important that the major axis of the dove prism be accurately aligned with its axis of rotation and with the optical axis so that the image does not wobble as the dove prism rotates.

The end face 31 of the optical image bundle 30 may be adjusted by sliding along the optical axis in order that the end face be at the focal point of the collimating lens. Desirably, adjustments radially of that optical axis may also be made to center the end face 31 of the optical bundle 30 on the optical axis.

While certain preferred embodiments of the present invention have been disclosed in detail, it is to be understood that various modifications may be adopted without departing from the spirit of the invention or scope of the following claims.

I claim:

1. In an arc welding vision system, for use in the automatic control of welding operations of an arc welding robot, of the type including a welding torch, and a control computer, an improved optical portion of the vision system comprising:
    (a) optical imaging and transmission means associated with the welding torch for collecting and transmitting image bearing light along an optical path from the weld pool and joint of a workpiece;
    (b) a video camera means positioned in said optical path for receipt of said image bearing light upon a detector of the camera means, the video output of the camera being connected to signal and data processing circuit means and through it in turn to said control computer;
    (c) an adjustable light intensity varying means substantially coaxially interposed in said optical path for controllably varying the intensity of light transmitted to said camera detector;
    (d) a first feedback control system means including a first set point input means for adjusting said light intensity varying means, and means for detecting the difference between the first set point input and the light intensity through said light intensity varying means, said first set point input connected to said control computer for receipt of a first set point signal;
    (e) an adjustable image rotating means interposed and mounted substantially coaxially in said optical path for rotating the light along the path through an adjustable angle of rotation; and
    (f) a second feedback control system means including a second set point input means for adjusting the image rotating means and means for detecting the difference between a second set point input and the angle of image rotation, said second set point input connected to said control computer for receipt of a second set point signal.

2. An apparatus in accordance with claim 1 wherein:
    (a) said light intensity varying means comprises an iris, the means for adjusting the light intensity varying means comprises a first servo motor and the means for detecting the difference between the first set point and the light intensity comprises a first potentiometer drivingly linked to the first servo motor and a first summing junction means having one input connected to the output of the first potentiometer and the other input connected to the first set point input; and
    (b) said adjustable image rotating means comprises a dove prism mounted for rotation substantially about the central axis of the light path, the means for adjusting the image rotating means comprises a second servo motor and the means for detecting the difference between the second set point and the angle of image rotation comprises a second potentiometer drivingly linked to the second servo motor and a second summing junction means having one input connected to the output of the second potentiometer and the other input connected to the second set point input.

3. An apparatus in accordance with claim 1 or 2 wherein:
    the optical imaging and transmission means includes a fiber optic image bundle transmission cable extending from the torch to a remote location and lens means mounted to said torch for focusing an image onto the torch end of the fiber optic cable and wherein
a collimating lens is positioned to collimate and direct light from the remote end of the fiber optic cable through the light intensity varying means; and
the image rotating means is positioned to receive light from the light intensity varying means and direct it upon said video camera means.

4. A method for obtaining a field of digital data representing pixels of an image of a weld scene including the joint and the weld pool for use in the automated control of an arc welding robot by means of a digital data processing control computer, said method being of the type wherein light radiated from the weld scene is focused on the detector of a video camera, the method comprising:
optically rotating the light from the weld scene during a weld operation through an angle of rotation to maintain the weld scene at substantially the identical orientation on said detector as the welding operation progresses along the joint.

5. A method in accordance with claim 4 wherein said light is rotated by collimating said light, directing it through a dove prism and rotating said prism.

6. A method in accordance with claim 4 or 5 and further comprising:
(a) reducing the intensity of the light which is focused on said video camera detector sufficiently to reduce the intensity of the light from the weld pool to within the brightness operating range of the detector; and
(b) integrating the light incident upon the detector from the joint region and integrating the light incident upon the detector from the pool region whereby the joint region light is integrated over a plurality of camera frames greater in number than used for the light from the pool region.

7. A method in accordance with claim 6 wherein said camera includes an inject inhibit gate input and said light is integrated by activating said inject inhibit gate input during the portion of a frame which includes an image of said joint region.

8. A method in accordance with claim 7 wherein said inject inhibit gate is disabled during one frame and is activated during said portion of a second frame.

9. A method for obtaining a field of digital data representing pixels of an image of a weld scene including the joint and the weld pool for use in the automated control of an arc welding robot by means of a digital data processing control computer, said method being of the type wherein light radiated from the weld scene is focused on the detector of a video camera, the method comprising:
(a) reducing the intensity of the light which is focused on the video camera detector sufficiently to reduce the intensity of the light from the weld pool to within the brightness operating range of the detector; and
(b) integrating the light incident upon the detector from the joint region over a plurality of camera frames.

10. method in accordance with claim 9 wherein said camera includes an inject inhibit gate input and said light is integrated by activating said inject inhibit gate input during the portion of a frame which includes an image of said joint region.

11. A method in accordance with claim 10 wherein said IIG is disabled during one frame and is activated during said portion of a second frame.

* * * * *